(12) United States Patent
Yadav et al.

(10) Patent No.: US 10,505,819 B2
(45) Date of Patent: Dec. 10, 2019

(54) METHOD AND APPARATUS FOR COMPUTING CELL DENSITY BASED RARENESS FOR USE IN ANOMALY DETECTION

(71) Applicant: CISCO TECHNOLOGY, INC., San Jose, CA (US)

(72) Inventors: Navindra Yadav, Cupertino, CA (US); Ellen Scheib, Mountain View, CA (US); Rachita Agasthy, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 803 days.

(21) Appl. No.: 15/091,061

(22) Filed: Apr. 5, 2016

(65) Prior Publication Data

US 2016/0359685 A1 Dec. 8, 2016

Related U.S. Application Data

(60) Provisional application No. 62/171,044, filed on Jun. 4, 2015.

(51) Int. Cl.
  *G06N 7/00* (2006.01)
  *H04L 12/24* (2006.01)
  *H04L 12/26* (2006.01)

(52) U.S. Cl.
  CPC ............. *H04L 41/16* (2013.01); *G06N 7/005* (2013.01); *H04L 41/142* (2013.01); *H04L 43/062* (2013.01)

(58) Field of Classification Search
  CPC .. G06N 3/04; G06N 5/04; G06N 7/00; G06N 7/005; G06F 11/00; G06F 12/04; G06F 12/16; G06F 15/173; G06F 15/18; G06F 17/30; G06F 21/00; G06G 7/00; G08B 21/00; G08B 23/00; H04L 1/00; H04L 43/045
  See application file for complete search history.

(56) References Cited

U.S. PATENT DOCUMENTS

| 6,769,066 B1 | 7/2004 | Botros et al. |
| 7,962,611 B2 | 6/2011 | Hurley et al. |
| 8,001,583 B2 | 8/2011 | Waizumi et al. |
| 8,306,931 B1 | 11/2012 | Bowman et al. |
| 8,495,060 B1 | 7/2013 | Chang |

(Continued)

OTHER PUBLICATIONS

Goldstein et al, "Histogram-based Outlier Score (HBOS): A fast Unsupervised Anomaly Detection Algorithm", German Research Center for Artificial Intelligence, pp. 59-63. (Year: 2012).*

(Continued)

*Primary Examiner* — Vincent Gonzales
(74) *Attorney, Agent, or Firm* — Cindy Kaplan

(57) ABSTRACT

In one embodiment, a method includes receiving network data at an analytics device, grouping features of the network data into multivariate bins, generating a density for each of the multivariate bins, computing a rareness metric for each of the multivariate bins based on a probability of obtaining a feature in a bin and the probability for all other of the multivariate bins with equal or smaller density, and identifying anomalies based on computed rareness metrics. An apparatus and logic are also disclosed herein.

20 Claims, 10 Drawing Sheets

(56) References Cited

U.S. PATENT DOCUMENTS

| | | | | |
|---|---|---|---|---|
| 8,601,575 | B2* | 12/2013 | Mullarkey | H04L 41/142 709/224 |
| 8,707,431 | B2* | 4/2014 | Stephens | H04L 41/5061 726/22 |
| 8,869,276 | B2 | 10/2014 | Crovella et al. | |
| 8,938,532 | B2 | 1/2015 | Terrell et al. | |
| 9,692,775 | B2* | 6/2017 | Zhang | H04L 43/024 |
| 9,843,596 | B1* | 12/2017 | Averbuch | H04L 63/1416 |
| 2003/0097439 | A1* | 5/2003 | Strayer | H04L 51/34 709/224 |
| 2004/0168100 | A1 | 8/2004 | Thottan et al. | |
| 2004/0205374 | A1* | 10/2004 | Poletto | H04L 41/064 714/4.2 |
| 2006/0098579 | A1* | 5/2006 | Chang | H04L 41/22 370/242 |
| 2009/0245122 | A1 | 10/2009 | Maiocco et al. | |
| 2011/0161484 | A1 | 6/2011 | Van Den Bogaert et al. | |
| 2013/0051247 | A1 | 2/2013 | Reese et al. | |
| 2014/0188895 | A1 | 7/2014 | Wang et al. | |
| 2014/0215055 | A1 | 7/2014 | Reynolds et al. | |
| 2015/0073894 | A1 | 3/2015 | Leaute et al. | |
| 2015/0106324 | A1 | 4/2015 | Puri et al. | |
| 2015/0180887 | A1 | 6/2015 | Wang et al. | |
| 2015/0195145 | A1 | 7/2015 | Di Pietro et al. | |
| 2016/0173535 | A1* | 6/2016 | Barabash | H04L 63/20 726/1 |
| 2016/0352767 | A1* | 12/2016 | Owhadi | G06F 17/18 |

OTHER PUBLICATIONS

Gang Shen et al, "Anomaly Detection Based on Aggregated Network Behavior Metrics", IEEE, pp. 2210-2213. (Year: 2007).*

Shin-Ying Huang, "Network traffic anomaly detection based on growing hierarchical SOM", IEEE, pp. 1-2. (Year: 2013).*

Kingsly Leung, "Unsupervised Anomaly Detection in Network Intrusion Detection Using Clusters", Australian Computer Society, pp. 333-342. (Year: 2005).*

Andreas Kind et al, "Histogram-Based Traffic Anomaly Detection", IEEE, vol. 6, No. 2, pp. 110-121. (Year: 2009).*

Devroye, L. and Lugosi, G., "Bin width selection in multivariate histograms by the combinatorial method", Sociedad de Estadistica Operativa Test, vol. 13, No. 1, 2004, pp. 129-145. (Year: 2004).*

Chandola, V., Banerjee, A., and Kumar, V, "Anomaly detection: A survey" ACM Comput. Surv. 41, 3, Jul. 2009, 58 pages. (Year: 2009).*

Scott, D., Multivariate Density Estimation: Theory, Practice, and Visualization, John Wiley & Sons, Inc., Mar. 12, 2015, chapt 2, pp. 36-50. (Year: 2015).*

\* cited by examiner

METHOD AND APPARATUS FOR COMPUTING CELL DENSITY BASED RARENESS FOR USE IN ANOMALY DETECTION

STATEMENT OF RELATED APPLICATION

The present application claims priority from U.S. Provisional Application No. 62/171,044, entitled ANOMALY DETECTION WITH PERVASIVE VIEW OF NETWORK BEHAVIOR, filed on Jun. 4, 2015. The contents of this provisional application are incorporated herein by reference in its entirety.

TECHNICAL FIELD

The present disclosure relates generally to communication networks, and more particularly, to anomaly detection.

BACKGROUND

Anomaly detection is used to identify items, events, or traffic that exhibit behavior that does not conform to an expected pattern or data. Anomaly detection systems may, for example, learn normal activity and take action for behavior that deviates from what is learned as normal behavior. Density estimation is a technique that may be used for anomaly detection.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
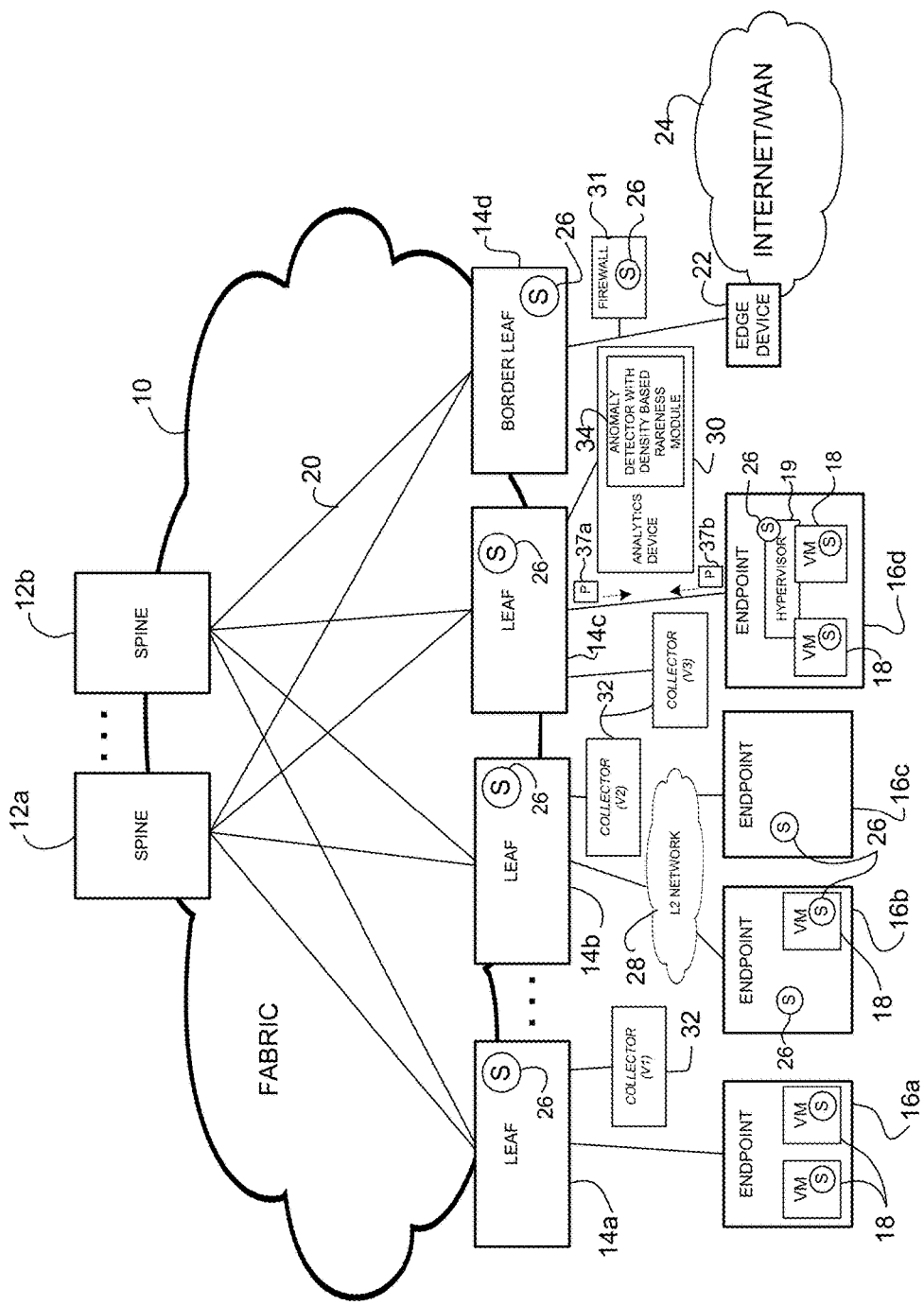
FIG. 1 illustrates an example of a network in which embodiments described herein may be implemented.

In one embodiment, a method generally comprises receiving network data at an analytics device, grouping features of the network data into multivariate bins, generating a density for each of the multivariate bins, computing a rareness metric for each of the multivariate bins based on a probability of obtaining a feature in a bin and the probability for all other of the multivariate bins with equal or smaller density, and identifying anomalies based on computed rareness metrics.

In another embodiment, an apparatus generally comprises an interface for receiving network data and a processor for grouping features of the network data into multivariate bins, generating a density for each of the multivariate bins, computing a rareness metric for each of the multivariate bins based on a probability of obtaining a feature in a bin and the probability for all other of the multivariate bins with equal or smaller density, and identifying anomalies based on computed rareness metrics.

In yet another embodiment, logic is encoded on one or more non-transitory computer readable media for execution and when executed operable to process network data, group features of the network data into multivariate bins, generate a density for each of the multivariate bins, compute a rareness metric for each of the multivariate bins based on a probability of obtaining a feature in a bin and the probability for all other of the multivariate bins with equal or smaller density, and identify anomalies based on computed rareness metrics.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The goal of anomaly detection is to identify observations that differ from other examples in a dataset. Density estimation is a statistical technique that may be used for anomaly detection. In density estimation, an estimate of the underlying probability density may be generated using a sample of data. The histogram is one of the techniques that may be used to estimate density. Histogram based techniques for anomaly detection may be used to compute an outlier score separately for each dimension and then aggregate scores. This approach may be insufficient for high dimensionality network metadata due to the complex and significant multivariate relationships between dimensions. Kernel density techniques may be used to generate a continuous density estimate, which may be conceptualized as smoothed histograms. This approach has drawbacks such as complexity, selection of bandwidth and kernel, and over smoothing, which tends to over smooth rich, spiky, distributions.

The embodiments described herein provide a nonparametric approach to anomaly detection based on multivariate histograms. As described in detail below, rareness may be determined based on the ordering of densities of the multivariate cells. In one or more embodiments, bins (cells) with varying width are used to reduce noise where density is low (wide bins) and gain precision where density is high (narrow bins). The optimal number of bins may depend on the distribution of the data and the goal of the analysis.

The term nonparametric as used herein refers to a method that is not based on parameterized probability distributions (distribution-free). The nonparametric approach does not rely on data belonging to any particular distribution. Rather than having a fixed number of parameters, the number of parameters may grow with the amount of data, for example. Nonparametric approaches are flexible in that they support distributions of any shape and do not impose assumptions on the distributions of data. In the network traffic domain, using a nonparametric approach is important due to the irregular and varying distributions observed in network metadata.

The term multivariate as used herein refers to cells, histograms, or density estimates that are dependent on the combination of features, rather than features independently. The multivariate approach uses simultaneous observation and analysis of more than one outcome variable. In the network traffic domain, a univariate approach to anomaly detection may not be sufficient for identifying suspicious behavior. Since complex multivariate relationships exist between features, a univariate approach would likely only be able to detect a small percentage of flows with anomalous properties.

Density estimation is a flexible and powerful method for anomaly detection that does not require assumptions or infer meaning based on distance. This is especially appropriate for the domain of network metadata since numeric distributions exhibit unique qualities not often present in other domains. Many of the numeric network metadata features (e.g., packet count, byte size, or other features) can be conceptualized as using a hybrid of both numeric and nominal scales of measurement. For example, the ratio of flow byte size has meaning (numeric), however, there are particular byte size values that correspond to specific flow events, such as the initial TCP (Transmission Control Protocol) handshake establishing a connection (nominal). Therefore, since distance based approaches are not appropriate for categorical type information, density estimation is an appropriate approach in this context. For some dimensions, the frequency of the value of a feature may be more informative than the value of the feature.

The network traffic anomalies may be identified in multidimensional data with many features. The network metadata features may be mixed, involving categorical, binary, and numeric features. Many of the univariate feature distributions may be irregular, exhibiting spikiness and pockets of sparsity. The scales may differ, thus limiting the use of distance-based approaches. The features may not be independent and exhibit irregular, multivariate relationships. The embodiments described herein provide an anomaly detection system appropriate for data with these characteristics.

In one or more embodiments, network data may be collected throughout a network such as a data center using multiple vantage points. This provides a pervasive view of network behavior, using metadata from every (or almost every) packet. In one or more embodiments, an analytics system provides a big data analytics platform that monitors everything (or almost everything) while providing pervasive security. One or more embodiments may provide visibility from every (or almost every) host, process, and user perspective. The network metadata may be combined in a central big data analytics platform for analysis. With information about network behavior captured from multiple perspectives, the various data sources can be correlated to provide a powerful information source for data analytics.

The comprehensive and pervasive information about network behavior that is collected over time and stored in a central location enables the use of machine learning algorithms to detect suspicious activity. Multiple approaches to modeling normal or typical network behavior may be used and activity that does not conform to this expected behavior may be flagged as suspicious, and may be investigated. Machine learning allows for the identification of anomalies within the network traffic based on dynamic modeling of network behavior.

Referring now to the drawings, and first to FIG. 1, a simplified network in which embodiments described herein may be implemented is shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, corporate network, Internet, intranet, radio access network, public switched network, or any other network). Network traffic may also travel between a main campus and remote branches or any other networks.

In the example of FIG. 1, a fabric 10 comprises a plurality of spine nodes 12a, 12b and leaf nodes 14a, 14b, 14c, 14d. The leaf nodes 14a, 14b, 14c, may connect to one or more endpoints (hosts) 16a, 16b, 16c, 16d (e.g., servers hosting virtual machines (VMs) 18). The leaf nodes 14a, 14b, 14c, 14d are each connected to a plurality of spine nodes 12a, 12b via links 20. In the example shown in FIG. 1, each leaf node 14a, 14b, 14c, 14d is connected to each of the spine nodes 12a, 12b and is configured to route communications between the hosts 16a, 16b, 16c, 16d and other network elements.

The leaf nodes 14a, 14b, 14c, 14d and hosts 16a, 16b, 16c, 16d may be in communication via any number of nodes or networks. As shown in the example of FIG. 1, one or more servers 16b, 16c may be in communication via a network 28 (e.g., layer 2 (L2) network). In the example shown in FIG. 1, border leaf node 14d is in communication with an edge device 22 (e.g., router) located in an external network 24 (e.g., Internet/WAN (Wide Area Network)). The border leaf 14d may be used to connect any type of external network device, service (e.g., firewall 31), or network (e.g., layer 3 (L3) network) to the fabric 10.

The spine nodes 12a, 12b and leaf nodes 14a, 14b, 14c, 14d may be switches, routers, or other network devices (e.g., L2, L3, or L2/L3 devices) comprising network switching or routing elements configured to perform forwarding functions. The leaf nodes 14a, 14b, 14c, 14d may include, for example, access ports (or non-fabric ports) to provide connectivity for hosts 16a, 16b, 16c, 16d, virtual machines 18, or other devices or external networks (e.g., network 24), and fabric ports for providing uplinks to spine switches 12a, 12b.

The leaf nodes 14a, 14b, 14c, 14d may be implemented, for example, as switching elements (e.g., Top of Rack (ToR) switches) or any other network element. The leaf nodes 14a, 14b, 14c, 14d may also comprise aggregation switches in an end-of-row or middle-of-row topology, or any other topology. The leaf nodes 14a, 14b, 14c, 14d may be located at the edge of the network fabric 10 and thus represent the physical network edge. One or more of the leaf nodes 14a, 14b, 14c, 14d may connect Endpoint Groups (EGPs) to network fabric 10, internal networks (e.g., network 28), or any external network (e.g., network 24). EPGs may be used, for example, for mapping applications to the network.

Endpoints 16a, 16b, 16c, 16d may connect to network fabric 10 via the leaf nodes 14a, 14b, 14c. In the example shown in FIG. 1, endpoints 16a and 16d connect directly to leaf nodes 14a and 14c, respectively, which can connect the hosts to the network fabric 10 or any other of the leaf nodes. Endpoints 16b and 16c connect to leaf node 14b via L2 network 28. Endpoints 16b, 16c and L2 network 28 may define a LAN (Local Area Network). The LAN may connect nodes over dedicated private communication links located in the same general physical location, such as a building or campus.

WAN 24 may connect to leaf node 14d via an L3 network (not shown). The WAN 24 may connect geographically dispersed nodes over long distance communication links, such as common carrier telephone lines, optical lightpaths, synchronous optical networks (SONETs), or synchronous digital hierarchy (SDH) links. The Internet is an example of a WAN that connects disparate networks and provides global communication between nodes on various networks. The nodes may communicate over the network by exchanging discrete frames or packets of data according to predefined protocols, such as Transmission Control Protocol (TCP)/Internet Protocol (IP).

One or more of the endpoints may have instantiated thereon one or more virtual switches (not shown) for communication with one or more virtual machines 18. Virtual switches and virtual machines 18 may be created and run on each physical server on top of a hypervisor 19 installed on the server, as shown for endpoint 16d. For ease of illustration, the hypervisor 19 is only shown on endpoint 16d, but it is to be understood that one or more of the other endpoints having virtual machines 18 installed thereon may also comprise a hypervisor. Also, one or more of the endpoints may include a virtual switch. The virtual machines 18 are configured to exchange communication with other virtual machines. The network may include any number of physical servers hosting any number of virtual machines 18. The host may also comprise blade/physical servers without virtual machines (e.g., host 16c in FIG. 1).

The term 'host' or 'endpoint' as used herein may refer to a physical device (e.g., server, endpoint 16a, 16b, 16c, 16d) or a virtual element (e.g., virtual machine 18). The endpoint may include any communication device or component, such as a computer, server, hypervisor, virtual machine, container, process (e.g., running on a virtual machine), switch, router, gateway, host, device, external network, etc.

One or more network devices may be configured with virtual tunnel endpoint (VTEP) functionality, which connects an overlay network (not shown) with network fabric 10. The overlay network may allow virtual networks to be created and layered over a physical network infrastructure.

The embodiments include a network behavior data collection and analytics system comprising a plurality of sensors 26 located throughout the network, collectors 32, and analytics device 30. The data monitoring and collection system may be integrated with existing switching hardware and software and operate within an Application-Centric Infrastructure (ACI), for example.

In certain embodiments, the sensors 26 are located at components throughout the network so that all packets are monitored. For example, the sensors 26 may be used to collect metadata for every packet traversing the network (e.g., east-west, north-south). The sensors 26 may be installed in network components to obtain network traffic data from packets transmitted from and received at the network components and monitor all network flows within the network. The term 'component' as used herein may refer to a component of the network (e.g., process, module, slice, blade, server, hypervisor, machine, virtual machine, switch, router, gateway, etc.).

In some embodiments, the sensors 26 are located at each network component to allow for granular packet statistics and data at each hop of data transmission. In other embodiments, sensors 26 may not be installed in all components or portions of the network (e.g., shared hosting environment in which customers have exclusive control of some virtual machines 18).

The sensors 26 may reside on nodes of a data center network (e.g., virtual partition, hypervisor, physical server, switch, router, gateway, or any other network device). In the example shown in FIG. 1, the sensors 26 are located at server 16c, virtual machines 18, hypervisor 19, leaf nodes 14a, 14b, 14c, 14d, and firewall 31. The sensors 26 may also be located at one or more spine nodes 12a, 12b or interposed between network elements.

A network device (e.g., endpoints 16a, 16b, 16d) may include multiple sensors 26 running on various components within the device (e.g., virtual machines, hypervisor, host) so that all packets are monitored (e.g., packets 37a, 37b to and from components). For example, network device 16d in the example of FIG. 1 includes sensors 26 residing on the hypervisor 19 and virtual machines 18 running on the host.

The installation of the sensors 26 at components throughout the network allows for analysis of network traffic data to and from each point along the path of a packet within the ACI. This layered sensor structure provides for identification of the component (i.e., virtual machine, hypervisor, switch) that sent the data and when the data was sent, as well as the particular characteristics of the packets sent and received at each point in the network. This also allows for the determination of which specific process and virtual machine 18 is associated with a network flow. In order to make this determination, the sensor 26 running on the virtual machine 18 associated with the flow may analyze the traffic from the virtual machine, as well as all the processes running on the virtual machine and, based on the traffic from the virtual machine, and the processes running on the virtual machine, the sensor 26 can extract flow and process information to determine specifically which process in the virtual machine is responsible for the flow. The sensor 26 may also extract user information in order to identify which user and process is associated with a particular flow. In one example, the sensor 26 may then label the process and user information and send it to the collector 32, which collects the statistics and analytics data for the various sensors 26 in the virtual machines 18, hypervisors 19, and switches 14a, 14b, 14c, 14d.

As previously described, the sensors 26 are located to identify packets and network flows transmitted throughout the system. For example, if one of the VMs 18 running at host 16d receives a packet 37a from the Internet 24, it may pass through router 22, firewall 31, switches 14d, 14c, hypervisor 19, and the VM. Since each of these components contains a sensor 26, the packet 37a will be identified and reported to collectors 32. In another example, if packet 37b is transmitted from VM 18 running on host 16d to VM 18 running on host 16a, sensors installed along the data path including at VM 18, hypervisor 19, leaf node 14c, leaf node 14a, and the VM at node 16a will collect metadata from the packet.

The sensors 26 may be used to collect information including, but not limited to, network information comprising metadata from every (or almost every) packet, process information, user information, virtual machine information, tenant information, network topology information, or other information based on data collected from each packet transmitted on the data path. The network traffic data may be associated with a packet, collection of packets, flow, group of flows, etc. The network traffic data may comprise, for example, VM ID, sensor ID, associated process ID, associated process name, process user name, sensor private key, geo-location of sensor, environmental details, etc. The network traffic data may also include information describing communication on all layers of the OSI (Open Systems Interconnection) model. For example, the network traffic data may include signal strength (if applicable), source/destination MAC (Media Access Control) address, source/destination IP (Internet Protocol) address, protocol, port number, encryption data, requesting process, sample packet, etc. In one or more embodiments, the sensors 26 may be configured to capture only a representative sample of packets.

The system may also collect network performance data, which may include, for example, information specific to file transfers initiated by the network devices, exchanged emails, retransmitted files, registry access, file access, network failures, component failures, and the like. Other data such as bandwidth, throughput, latency, jitter, error rate, and the like may also be collected.

Since the sensors 26 are located throughout the network, the data is collected using multiple vantage points (i.e., from multiple perspectives in the network) to provide a pervasive view of network behavior. The capture of network behavior information from multiple perspectives rather than just at a single sensor located in the data path or in communication with a component in the data path, allows data to be correlated from the various data sources to provide a useful information source for data analytics and anomaly detection. For example, the plurality of sensors 26 providing data to the collectors 32 may provide information from various network perspectives (view V1, view V2, view V3, etc.), as shown in FIG. 1.

The sensors 26 may comprise, for example, software (e.g., running on a virtual machine, container, virtual switch, hypervisor, physical server, or other device), an application-specific integrated circuit (ASIC) (e.g., component of a switch, gateway, router, standalone packet monitor, PCAP (packet capture) module), or other device. The sensors 26 may also operate at an operating system (e.g., Linux, Windows) or bare metal environment. In one example, the ASIC may be operable to provide an export interval of 10 msecs to 1000 msecs (or more or less) and the software may be operable to provide an export interval of approximately one second (or more or less). Sensors 26 may be lightweight, thereby minimally impacting normal traffic and compute resources in a data center. The sensors 26 may, for example, sniff packets sent over its host Network Interface Card (NIC) or individual processes may be configured to report traffic to the sensors. Sensor enforcement may comprise, for example, hardware, ACI/standalone, software, IP tables, Windows filtering platform, etc.

As the sensors 26 capture communications, they may continuously send network traffic data to collectors 32 for storage. The sensors may be used to collect data from streaming data, for example. The sensors 26 may send their records to one or more of the collectors 32. In one example, the sensors may be assigned primary and secondary collectors 32. In another example, the sensors 26 may determine an optimal collector 32 through a discovery process.

In certain embodiments, the sensors 26 may preprocess network traffic data before sending it to the collectors 32. For example, the sensors 26 may remove extraneous or duplicative data or create a summary of the data (e.g., latency, packets, bytes sent per flow, flagged abnormal activity, etc.).

The collectors 32 may serve as network storage for the system or the collectors may organize, summarize, and preprocess data. For example, the collectors 32 may tabulate data, characterize traffic flows, match packets to identify traffic flows and connection links, or flag anomalous data. The collectors 32 may also consolidate network traffic flow data according to various time periods.

Information collected at the collectors 32 may include, for example, network information (e.g., metadata from every packet, east-west and north-south), process information, user information (e.g., user identification (ID), user group, user credentials), virtual machine information (e.g., VM ID, processing capabilities, location, state), tenant information (e.g., access control lists), network topology, etc. Collected data may also comprise packet flow data that describes packet flow information or is derived from packet flow information, which may include, for example, a five-tuple or other set of values that are common to all packets that are related in a flow (e.g., source address, destination address, source port, destination port, and protocol value, or any combination of these or other identifiers). The collectors 32 may utilize various types of database structures and memory, which may have various formats or schemas.

In some embodiments, the collectors 32 may be directly connected to a top-of-rack switch (e.g., leaf node). In other embodiments, the collectors 32 may be located near an end-of-row switch. In certain embodiments, one or more of the leaf nodes 14a, 14b, 14c, 14d may each have an associated collector 32. For example, if the leaf node is a top-of-rack switch, then each rack may contain an assigned collector 32. The system may include any number of collectors 32 (e.g., one or more).

The analytics device (module) 30 is configured to receive and process network traffic data collected by collectors 32 and detected by sensors 26 placed on nodes located throughout the network. The analytics device 30 may be, for example, a standalone network appliance or implemented as a VM image that can be distributed onto a VM, cluster of VMs, Software as a Service (SaaS), or other suitable distribution model. The analytics device 30 may also be located at one of the endpoints or other network device, or distributed among one or more network devices.

In certain embodiments, the analytics device 30 may determine dependencies of components within the network using an application dependency module. The analytics device 30 may establish patterns and norms for component behavior or address policy usage. In one embodiment, the analytics device 30 may also discover applications or select machines on which to discover applications, and then run application dependency algorithms.

In certain embodiments, the analytics device 30 may be implemented in an active-standby model to ensure high availability, with a first analytics module functioning in a primary role and a second analytics module functioning in a secondary role. If the first analytics module fails, the second analytics module can take over control.

As shown in FIG. 1, the analytics device 30 includes an anomaly detector 34. The anomaly detector 34 may operate at any computer or network device (e.g., server, controller, appliance, management station, or other processing device or network element) operable to receive network performance data and, based on the received information, identify features in which an anomaly deviates from other features. The anomaly detector 34 may, for example, learn what causes security violations by monitoring and analyzing behavior and events that occur prior to the security violation taking place, in order to prevent such events from occurring in the future.

Computer networks may be exposed to a variety of different attacks that expose vulnerabilities of computer systems in order to compromise their security. For example, network traffic transmitted on networks may be associated with malicious programs or devices. The anomaly detector 34 may be provided with examples of network states corresponding to an attack and network states corresponding to normal operation. The anomaly detector 34 can then analyze network traffic flow data to recognize when the network is under attack. In some example embodiments, the network may operate within a trusted environment for a period of time so that the anomaly detector 34 can establish a baseline normalcy. The analytics device 30 may include a database or norms and expectations for various components. The database may incorporate data from external sources. In certain embodiments, the analytics device 30 may use machine learning techniques to identify security threats to a network using the anomaly detector 34. Since malware is constantly evolving and changing, machine learning may be used to dynamically update models that are used to identify malicious traffic patterns. Machine learning algorithms may be used to provide for the identification of anomalies within the network traffic based on dynamic modeling of network behavior.

The anomaly detector 34 may be used to identify observations which differ from other examples in a dataset. For example, if a training set of example data with known outlier labels exists, supervised anomaly detection techniques may be used. Supervised anomaly detection techniques utilize data sets that have been labeled as "normal" and "abnormal" and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set. In one or more embodiments, an unsupervised machine learning technique is used to identify network anomalies in multidimensional network metadata.

The anomaly detector 34 may comprise a density based rareness module operable to compute cell density based rareness for use in anomaly detection. As described below, the embodiments may utilize an approach to anomaly detection for network behavior based on the cumulative probability of time series weighted multivariate binned feature density estimates. Weight may depend, for example, on the freshness of observed data (time of observation) (e.g., based on time sensed, collected, or received). In some embodiments, features may be grouped with bin (cell) boundaries defined empirically based on univariate transition points. A rareness metric for each cell may be computed based on cumulative probability of cells with equal or smaller density. This allows for new observations to be tagged based on rare feature combinations that are historically unusual, and therefore, potentially suspicious. Details of density based rareness calculations for network anomaly detection are described further below.

It is to be understood that the network devices and topology shown in FIG. 1 and described above is only an example and the embodiments described herein may be implemented in networks comprising different network topologies or network devices, or using different protocols, without departing from the scope of the embodiments. For example, although network fabric 10 is illustrated and described herein as a leaf-spine architecture, the embodiments may be implemented based on any network topology, including any data center or cloud network fabric. The embodiments described herein may be implemented, for example, in other topologies including three-tier (e.g., core, aggregation, and access levels), fat tree, mesh, bus, hub and spoke, etc. The sensors 26 and collectors 32 may be placed throughout the network as appropriate according to various architectures. Furthermore, the density based rareness module at anomaly detector 34 may use network data (metadata) collected from any number of sensors either directly or via one or more collectors, from any number of locations within the network. Thus, the embodiments described herein for determining cell density based rareness may be used in any network topology comprising any number or arrangement of data sensors or collectors. The network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks.

Moreover, the topology illustrated in FIG. 1 and described above is readily scalable and may accommodate a large number of components, as well as more complicated arrangements and configurations. For example, the network may include any number of fabrics 10, which may be geographically dispersed or located in the same geographic area. Thus, network nodes may be used in any suitable network topology, which may include any number of servers, virtual machines, switches, routers, appliances, controllers, gateways, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
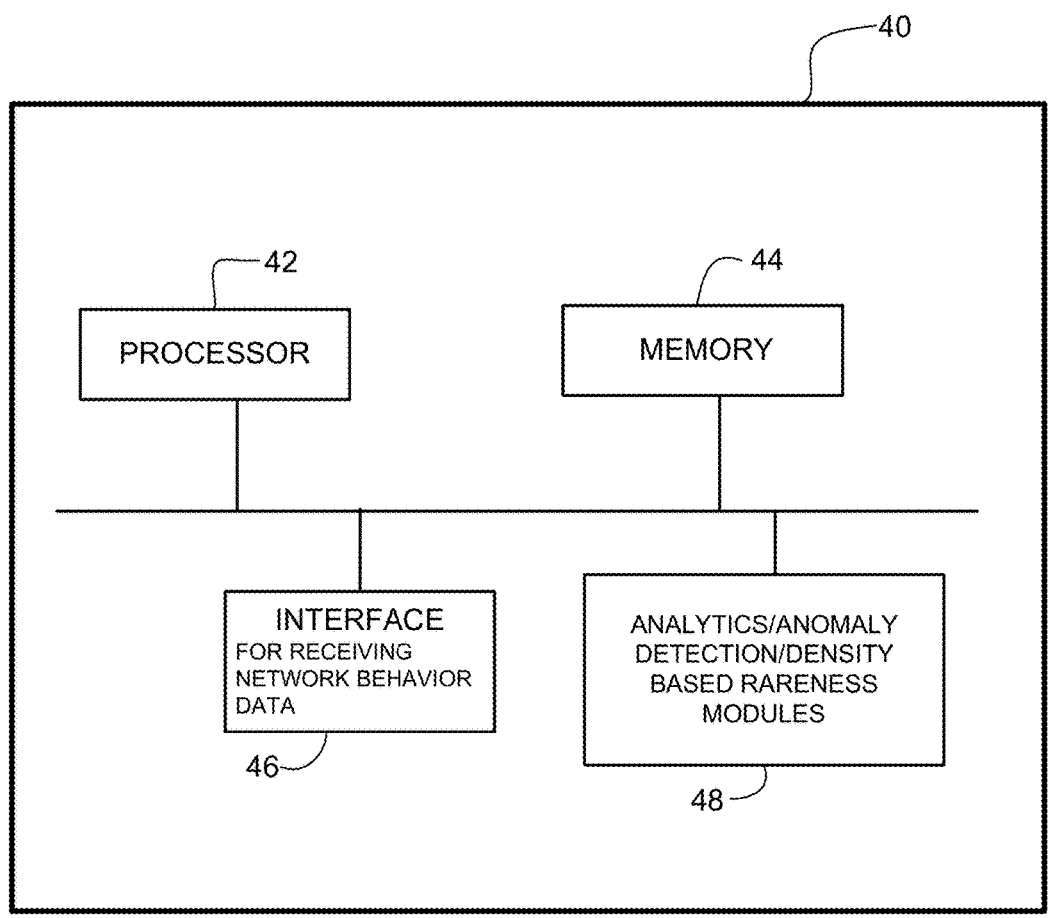
FIG. 2 depicts an example of a network device useful in implementing embodiments described herein.

FIG. 2 illustrates an example of a network device 40 that may be used to implement the embodiments described herein. In one embodiment, the network device 40 is a programmable machine that may be implemented in hardware, software, or any combination thereof. The network device 40 includes one or more processor 42, memory 44, network interface 46, and analytics/anomaly detection/density based rareness modules 48 (analytics module 30, anomaly detector 34 shown in FIG. 1).

Memory 44 may be a volatile memory or non-volatile storage, which stores various applications, operating systems, modules, and data for execution and use by the processor 42. For example, one or more analytics/anomaly detection/density based rareness components (e.g., module, device, code, logic, software, firmware, etc.) may be stored in memory 44. The device may include any number of memory components.

Logic may be encoded in one or more tangible media for execution by the processor 42. For example, the processor 42 may execute codes stored in a computer-readable medium such as memory 44 to perform the processes described below with respect to FIGS. 5, 6, 9, and 10. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device may include any number of processors 42. In one example, the computer-readable medium comprises a non-transitory computer-readable medium.

The network interface 46 may comprise any number of interfaces (linecards, ports) for receiving data or transmitting data to other devices. The network interface 46 may include, for example, an Ethernet interface for connection to a computer or network. As shown in FIG. 1 and described above, the interface 46 may be configured to receive network data collected from a plurality of sensors 26 distributed throughout the network. The network interface 46 may be configured to transmit or receive data using a variety of different communication protocols. The interface may include mechanical, electrical, and signaling circuitry for communicating data over physical links coupled to the network. The network device 40 may further include any number of input or output devices.

It is to be understood that the network device 40 shown in FIG. 2 and described above is only an example and that different configurations of network devices may be used. For example, the network device 40 may further include any suitable combination of hardware, software, processors, devices, components, modules, or elements operable to facilitate the capabilities described herein.

Figure 3:
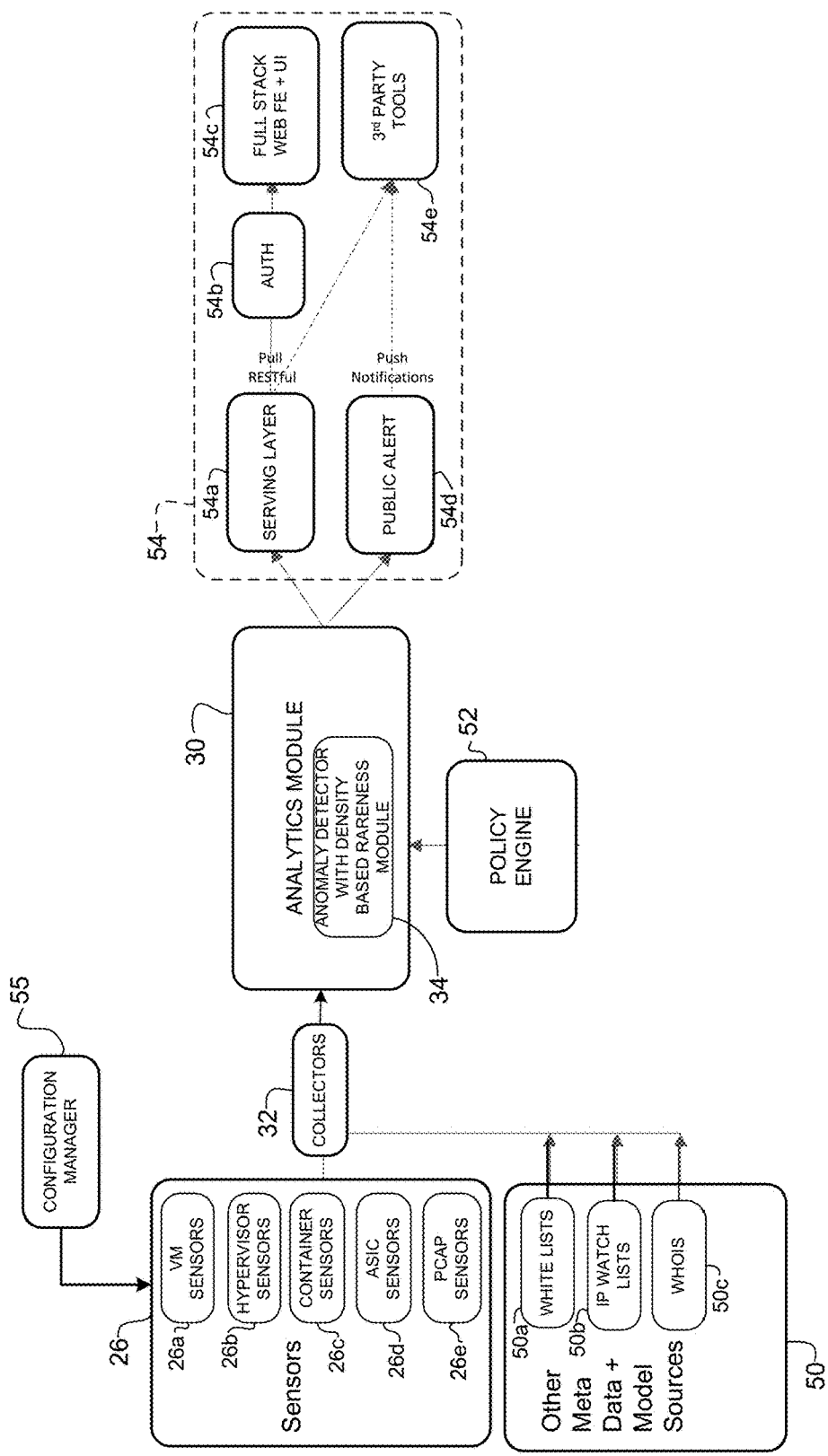
FIG. 3 illustrates a network behavior collection and analytics system for use in anomaly detection, in accordance with one embodiment.

FIG. 3 illustrates an example of a network behavior data collection and analytics system in accordance with one embodiment. The system may include sensors 26, collectors 32, and analytics module (engine) 30 described above with respect to FIG. 1. In the example shown in FIG. 3, the system further includes external data sources 50, policy engine 52, and presentation module 54. The analytics module 30 receives input from the sensors 26 via collectors 32 and from external data sources 50, while also interacting with the policy engine 52, which may receive input from a network/security policy controller (not shown). The analytics module 30 may provide input (e.g., via pull or push notifications) to a user interface or third party tools, via presentation module 54, for example.

In one embodiment, the sensors 26 may be provisioned and maintained by a configuration and image manager 55. For example, when a new virtual machine 18 is instantiated or when an existing VM migrates, configuration manager 55 may provision and configure a new sensor 26 on the VM (FIGS. 1 and 3).

As previously described, the sensors 26 may reside on nodes of a data center network. One or more of the sensors 26 may comprise, for example, software (e.g., piece of software running (residing) on a virtual partition, which may be an instance of a VM (VM sensor 26*a*), hypervisor (hypervisor sensor 26*b*), sandbox, container (container sensor 26*c*), virtual switch, physical server, or any other environment in which software is operating). The sensor 26 may also comprise an application-specific integrated circuit (ASIC) (ASIC sensor 26*d*) (e.g., component of a switch, gateway, router, standalone packet monitor, or other network device including a packet capture (PCAP) module (PCAP sensor 26*e*) or similar technology), or an independent unit (e.g., device connected to a network device's monitoring port or a device connected in series along a main trunk (link, path) of a data center).

The sensors 26 may send their records over a high-speed connection to one or more of the collectors 32 for storage. In certain embodiments, one or more collectors 32 may receive data from external data sources 50 (e.g., whitelists 50*a*, IP watch lists 50*b*, Who is data 50*c*, or out-of-band data.

In one or more embodiments, the system may comprise a wide bandwidth connection between collectors 32 and analytics module 30.

As described above, the analytics module 30 comprises an anomaly detector 34, which may use machine learning techniques to identify security threats to a network. The analytics module 30 may include examples of network states corresponding to an attack and network states corresponding to normal operation. The anomaly detector 34 can then analyze network traffic flow data to recognize when the network is under attack. The analytics module 30 may store norms and expectations for various components in a database, which may also incorporate data from external sources 50. The analytics module 30 may then create access policies for how components can interact using policy engine 52. Policies may also be established external to the system and the policy engine 52 may incorporate them into the analytics module 30. As described below, the anomaly detector 34 may be configured for cell density based rareness computations. Details of processing that may be performed by the anomaly detector 34 are described below with respect to FIGS. 5, 6, 9, and 10.

The presentation module 54 provides an external interface for the system and may include, for example, a serving layer 54*a*, authentication module 54*b*, web front end and UI (User Interface) 54*c*, public alert module 54*d*, and third party tools 54*e*. The presentation module 54 may preprocess, summarize, filter, or organize data for external presentation.

Figure 7:
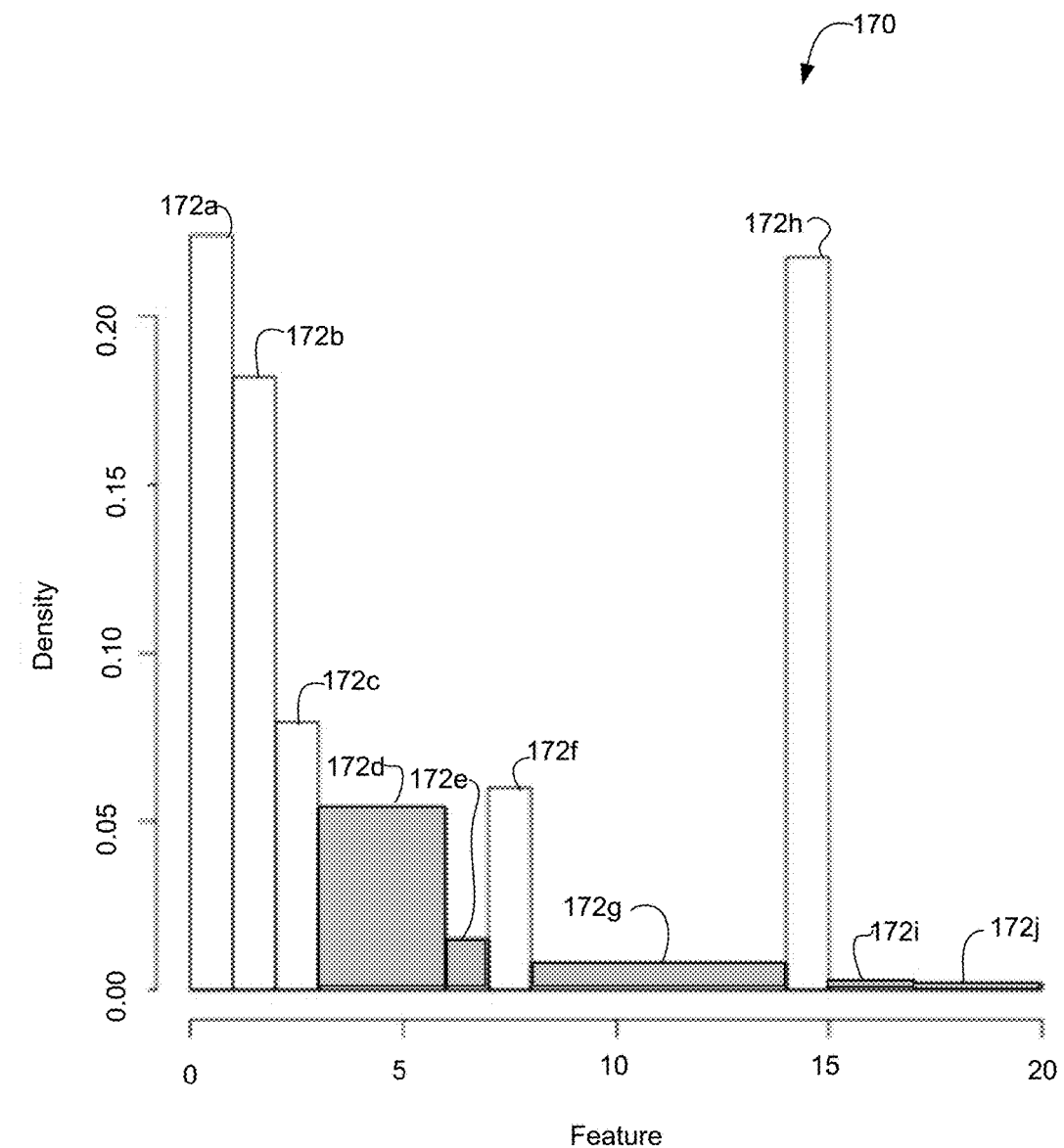
FIG. 7 illustrates an example of density based rareness using a varying bin width histogram.

The serving layer 54*a* may operate as the interface between presentation module 54 and the analytics module 30. The presentation module 54 may be used to generate a webpage. The web front end 54*c* may, for example, connect with the serving layer 54*a* to present data from the serving layer in a webpage comprising bar charts, core charts, tree maps, acyclic dependency maps, line graphs, tables, and the like. In one example, the presentation module 54 may be used to present histograms, such as shown in FIG. 7, for use in calculating density based rareness as described below.

The public alert module 54*d* may use analytic data generated or accessible through analytics module 30 and identify network conditions that satisfy specified criteria and push alerts to the third party tools 54*e*. One example of a third party tool 54*e* is a Security Information and Event Management (SIEM) system. Third party tools 54*e* may retrieve information from serving layer 54*a* through an API (Application Programming Interface) and present the information according to the SIEM's user interface, for example.

Figure 4:
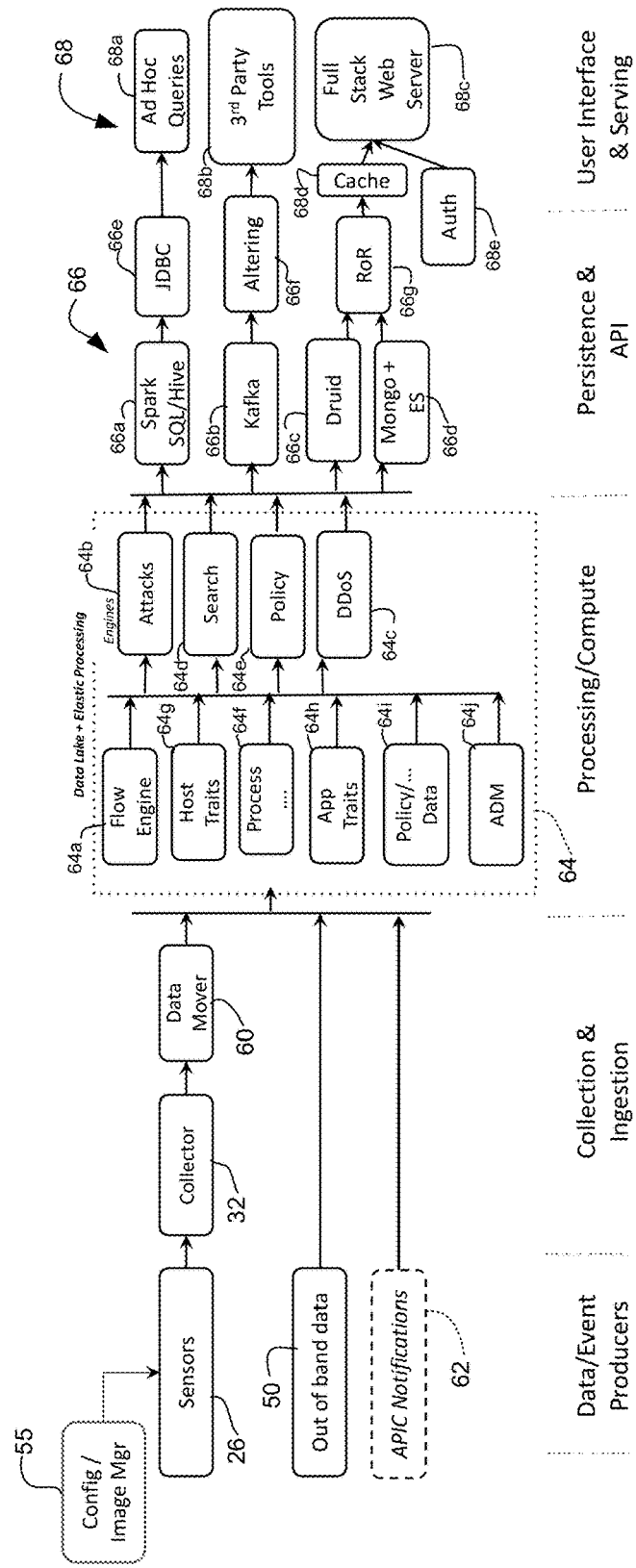
FIG. 4 illustrates details of the system of FIG. 3, in accordance with one embodiment.

FIG. 4 illustrates an example of a data processing architecture of the network behavior data collection and analytics system shown in FIG. 3, in accordance with one embodiment. As previously described, the system includes a configuration/image manager 55 that may be used to configure or manage the sensors 26, which provide data to one or more collectors 32. A data mover 60 transmits data from the collector 32 to one or more processing engines 64. The processing engine 64 may also receive out of band data 50 or APIC (Application Policy Infrastructure Controller) notifications 62. Data may be received and processed at a data lake or other storage repository. The data lake may be configured, for example, to store 275 Tbytes (or more or less) of raw data. The system may include any number of engines, including for example, engines for identifying flows (flow engine 64*a*) or attacks including DDoS (Distributed Denial of Service) attacks (attack engine 64*b*, DDoS engine 64*c*). The system may further include a search engine 64*d* and policy engine 64*e*. The search engine 64*d* may be configured, for example to perform a structured search, an NLP (Natural Language Processing) search, or a visual search. Data may be provided to the engines from one or more processing components.

The processing/compute engine 64 may further include processing component 64f operable, for example, to identify host traits 64g and application traits 64h and to perform application dependency mapping (ADM 64j). The process 64f may include, for example, a density based rareness computation process described below. The DDoS engine 64c may generate models online while the ADM 64j generates models offline, for example. In one embodiment, the processing engine is a horizontally scalable system that includes predefined static behavior rules. The compute engine may receive data from one or more policy/data processing components 64i.

The traffic monitoring system may further include a persistence and API (Application Programming Interface) portion, generally indicated at 66. This portion of the system may include various database programs and access protocols (e.g., Spark, Hive, SQL (Structured Query Language) 66a, Kafka 66b, Druid 66c, Mongo 66d), which interface with database programs (e.g. JDBC (JAVA Database Connectivity) 66e, altering 66f, RoR (Ruby on Rails) 66g). These or other applications may be used to identify, organize, summarize, or present data for use at the user interface and serving components, generally indicated at 68, and described above with respect to FIG. 3. User interface and serving segment 68 may include various interfaces, including for example, ad hoc queries 68a, third party tools 68b, and full stack web server 68c, which may receive input from cache 68d and authentication module 68e.

It is to be understood that the system and architecture shown in FIGS. 3 and 4, and described above is only an example and that the system may include any number or type of components (e.g., databases, processes, applications, modules, engines, interfaces) arranged in various configurations or architectures, without departing from the scope of the embodiments. For example, sensors 26 and collectors 32 may belong to one hardware or software module or multiple separate modules. Other modules may also be combined into fewer components or further divided into more components. Furthermore, the density based rareness computations described herein may be performed in systems comprising different architectures or components, without departing from the scope of the embodiments.

Figure 5:
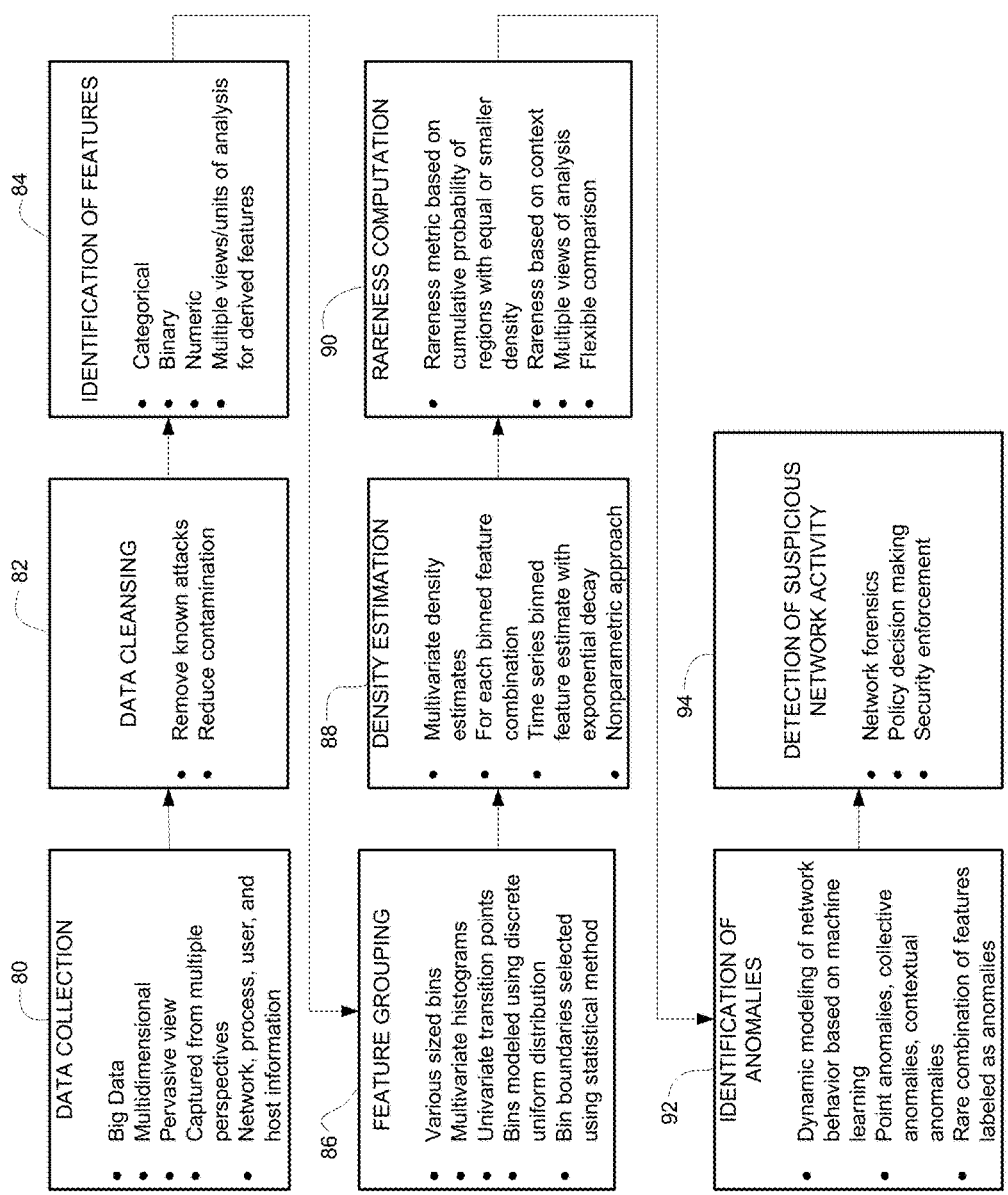
FIG. 5 illustrates a process flow for anomaly detection, in accordance with one embodiment.

FIG. 5 illustrates an overview of a process flow for anomaly detection, in accordance with one embodiment. As described above with respect to FIG. 1, the data may be collected at sensors 26 located throughout the network to monitor all packets passing through the network (step 80). The data may comprise, for example, raw flow data. The data collected may be big data (i.e., comprising large data sets having different types of data) and may be multidimensional. The data may be captured from multiple perspectives within the network to provide a pervasive network view. The data collected may include network information, process information, user information, and host information, for example.

In one or more embodiments the data source undergoes cleansing and processing at step 82. In data cleansing, rule-based algorithms may be applied and known attacks removed from the data for input to anomaly detection. This may be done to reduce contamination of density estimates from known malicious activity, for example.

Features are identified (derived, generated) for the data at step 84. Raw features may be used to derive consolidated signals. The collected data may comprise any number of features. Features may be expressed, for example, as vectors, arrays, tables, columns, graphs, or any other representations. For example, derived logarithmetic transformations may be produced for many of the numeric features. The network metadata features may be mixed and involve categorical, binary, and numeric features, for example. The feature distributions may be irregular and exhibit spikiness and pockets of sparsity. The scales may differ, features may not be independent, and may exhibit irregular relationships. The embodiments described herein provide an anomaly detection system appropriate for data with these characteristics. In one or more embodiments, a nonparametric, scalable method is defined for identifying network traffic anomalies in multidimensional data with many features.

The raw features may be used to derive consolidated signals. For example, from the flow level data, the average bytes per packet may be calculated for each flow direction. The forward to reverse byte ratio and packet ratio may also be computed. Additionally, forward and reverse TCP flags (such as SYN (synchronize), PSH (push), FIN (finish), etc.) may be categorized as both missing, both zero, both one, both greater than one, only forward, and only reverse. Derived logarithmic transformations may be produced for many of the numeric (right skewed) features. Feature sets may also be derived for different levels of analysis.

In certain embodiments discrete numeric features (e.g., byte count and packet count) and combination features are placed into bins of varying size (width, range) (step 86). Bins of constant size may be used, however, using varying bin width may be beneficial for reducing noise where density is low (wide bins) and gaining precision where density is high (narrow bins). The optimal number of bins may depend on the distribution of the data. In some embodiments, univariate transition points may be used so that bin ranges are defined by changes in the observed data. For example, the features may be grouped into bins comprising bin boundaries selected based on a probability that data within each of the bins follows a discrete uniform distribution. Cells may be optimally defined based on distribution characteristics, with boundaries at statistically defined univariate transition points. In one example, a statistical test may be used to identify meaningful transition points in the distribution.

In one embodiment, bin ranges are defined by changes in the observed data using a statistical approach for identifying meaningful transition points in the distribution. The distribution of a feature (e.g., bytes in network flow) may show regions of narrow spikes, pockets of sparseness, and areas of smooth coverage. A statistical method may be used to identify transitions between these different regions. The heterogeneous distribution may be divided into bins of which observations internally are homogenous. Since members of the same bin are associated with the same density estimate (constant), each bin may be modeled given an assumed discrete uniform distribution. For a candidate bin boundary, a test may be performed to determine the probability of observing the set of counts within this bin given an assumed discrete uniform distribution. If the probability exceeds a predefined value (alpha), it is concluded that the bin boundaries are appropriate. If there is no evidence to suggest that the underlying data within the bin does not follow a discrete uniform distribution, it is concluded that the bin boundaries are acceptable. However, if the data shows that the probability of observing the given frequency counts, given a discrete uniform distribution with the bin is unlikely, the bin boundaries are rejected, concluding that the bin exhibits heterogeneous data characteristics. In this scenario, the bin may be subdivided so that each bin exhibits data homogeneity within the bin. Bin boundaries may be defined such that the probability of the test is always larger than a predetermined value, alpha. In certain embodiments, the Pearson chi-square (CHISQ) test of equal proportions may be used to test the null hypothesis that the proportions (probabilities of success) of two or more values within the bin are the same. The above described process may be used to optimally define multivariate cells of varying width based on characteristics of the observed data.

The binned features may be used for density estimation purposes (step 88). In one example, a density may be computed for each binned feature combination to provide density estimates. Anomalies may be identified using non-parametric multivariate density estimation. The estimate of multivariate density may be generated based on historical frequencies of the discretized feature combinations to create time series binned feature density estimates. This provides increased data visibility and understandability, assists in outlier investigation and forensics, and provides building blocks for other potential metrics, views, queries, and experiment inputs. Details of density calculations, in accordance with one embodiment, are described below with respect to FIG. 9.

Rareness may then be calculated based on probability of regions with equal or smaller density (step 90). Rareness may be determined based on an ordering of densities of the multivariate cells. In one example, binned feature combinations with the lowest density correspond to the most rare regions. In one or more embodiments, a higher weight may be assigned to more recently observed data and a rareness value computed based on a cumulative probability of regions with equal or smaller density. Instead of computing a rareness value for each observation compared to all other observations, a rareness value may be computed based on particular contexts, as described below. Rareness metrics may also be calculated for different levels of analysis (entities). Details of rareness computations in accordance with one embodiment, are described below with respect to FIG. 10.

New observations with a historically rare combination of features may be labeled as anomalies whereas new observations that correspond to a commonly observed combination of features are not (step 92). The anomalies may include, for example, point anomalies, contextual anomalies, and collective anomalies. Point anomalies are observations that are anomalous with respect to the rest of the data. Contextual anomalies are anomalous with respect to a particular context (or subset of the data). A collective anomaly is a set of observations that are anomalous with respect to the data. All of these types of anomalies are applicable to identifying suspicious activity in network data. In one embodiment, contextual anomalies are defined using members of the same identifier group.

The identified anomalies may be used to detect suspicious network activity potentially indicative of malicious behavior (step 94). The identified anomalies may be used for downstream purposes including network forensics, policy generation, and enforcement. For example, one or more embodiments may be used to automatically generate optimal signatures, which can then be quickly propagated to help contain the spread of a malware family.

Figure 6:
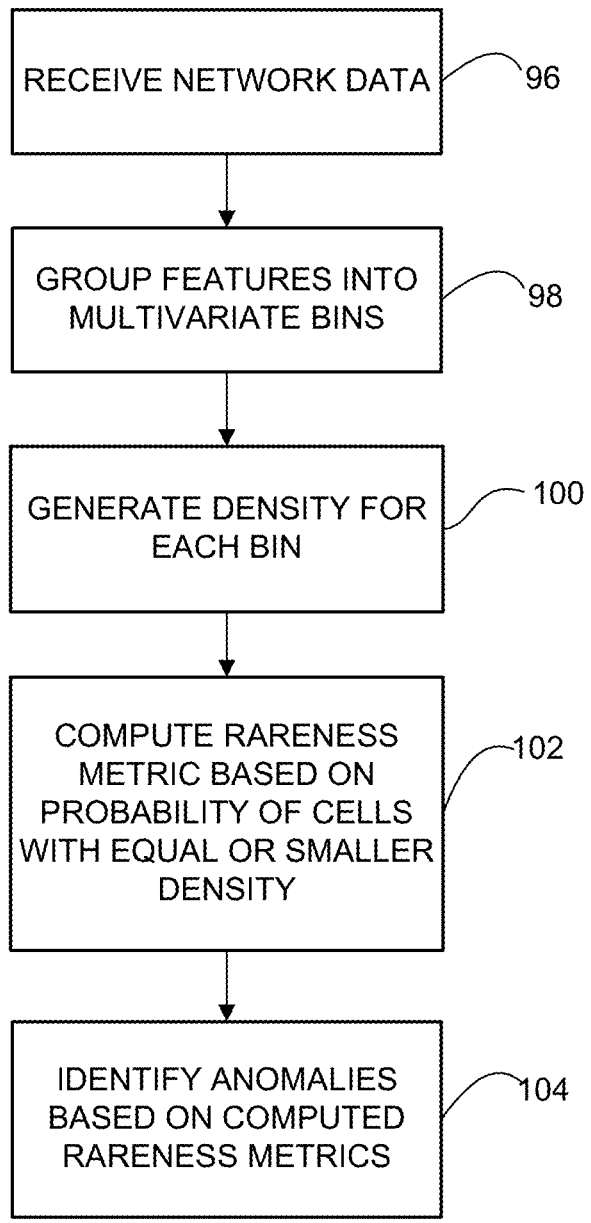
FIG. 6 is a flowchart illustrating an overview of a process for cell density based rareness computations, in accordance with one embodiment.

FIG. 6 is a flowchart illustrating an overview of a process for cell based density rareness, in accordance with one embodiment. Network data is received at the analytics device 30 (step 96) (FIGS. 1 and 6). As described above, network data may be collected from a plurality of sensors to provide a pervasive view of the network. For example, the network data may be collected from a plurality of sensors distributed throughout the network to monitor network flows within the network from multiple perspectives in the network. As described above with respect to steps 84-86 in FIG. 5, features are identified for the network data and grouped into multivariate bins (step 98). In one embodiment, the bins define cells of varying width, as shown in FIG. 7 and described below. For each binned feature combination, a density is generated (step 100). The density may be a time weighted feature density in which a higher weight is assigned to more recently observed features, while stale features are assigned lower weights (i.e., down weighted). In one embodiment, features are weighted using an exponential decay applied to cumulative binned feature combination counts. Once the density is calculated for each cell, cells may be ordered based on density. A rareness metric may then be computed for each of the multivariate bins based on a probability of obtaining a feature (observation) in a bin and the probability in bins with equal or smaller density (step 102). Anomalies may be identified based on the computed rareness metrics (step 104).

It is to be understood that the processes shown in FIGS. 5 and 6 and described above are only examples and that steps may be added, combined, removed, or modified without departing from the scope of the embodiments.

Figure 8:
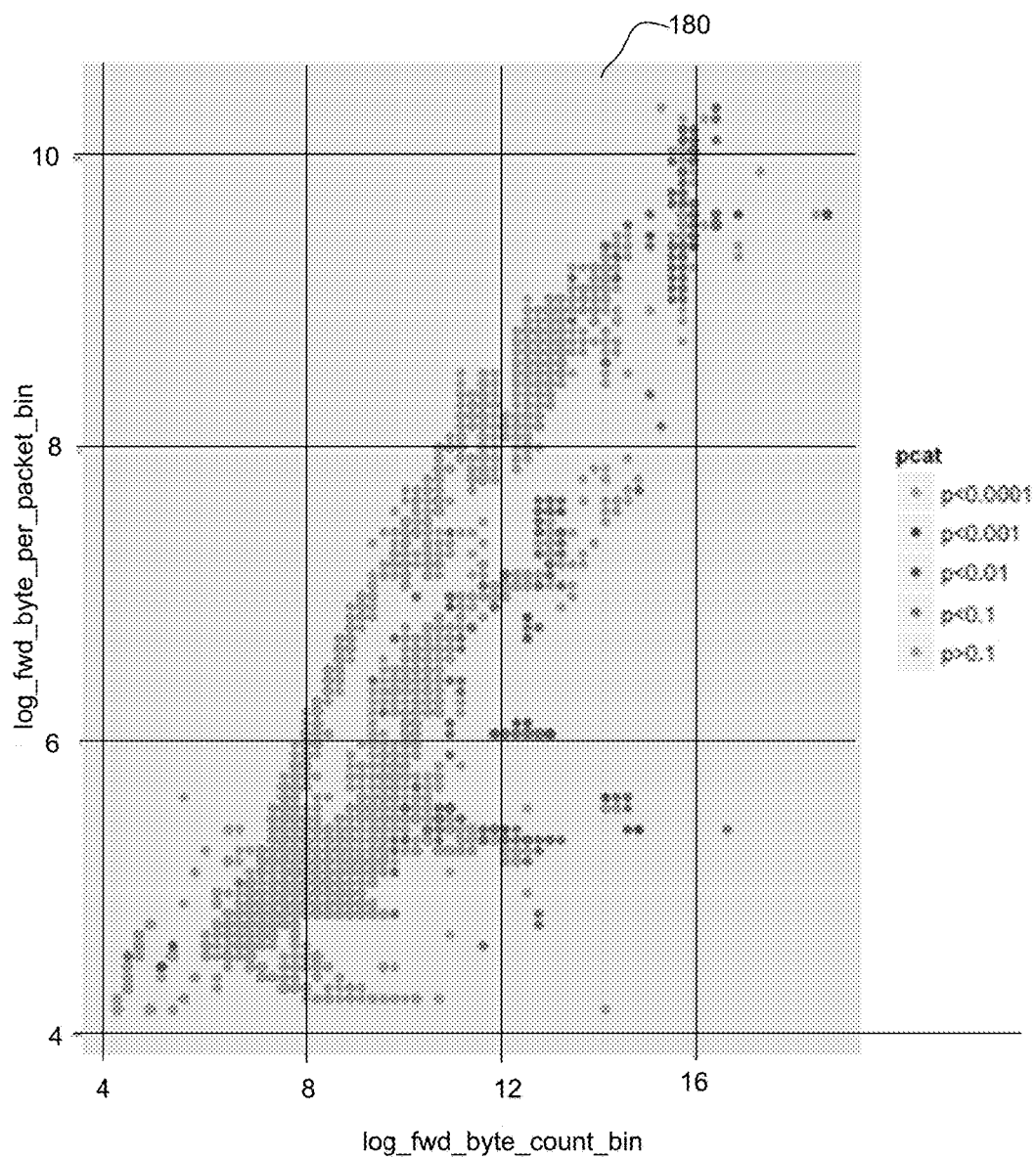
FIG. 8 is a graph illustrating how features are typically not independent within the network data.

As previously described, cell boundaries may be defined and features grouped into any number of multivariate bins. As shown in graph 170 of FIG. 7, the bins (cells) (172*a*, 172*b*, 172*c*, 172*d*, 172*e*, 172*f*, 172*g*, 172*h*, 172*i*, 172*j*) may have varying width (i.e., at least two bins have different widths (ranges)). The multivariate approach is used because features may not be independent in the network data, as shown in the example of FIG. 8. Graph 180 of FIG. 8 shows log_fwd_byte_per_packet_bin plotted with log_fwd_byte_count_bin to illustrate how these features are not independent.

Figure 9:
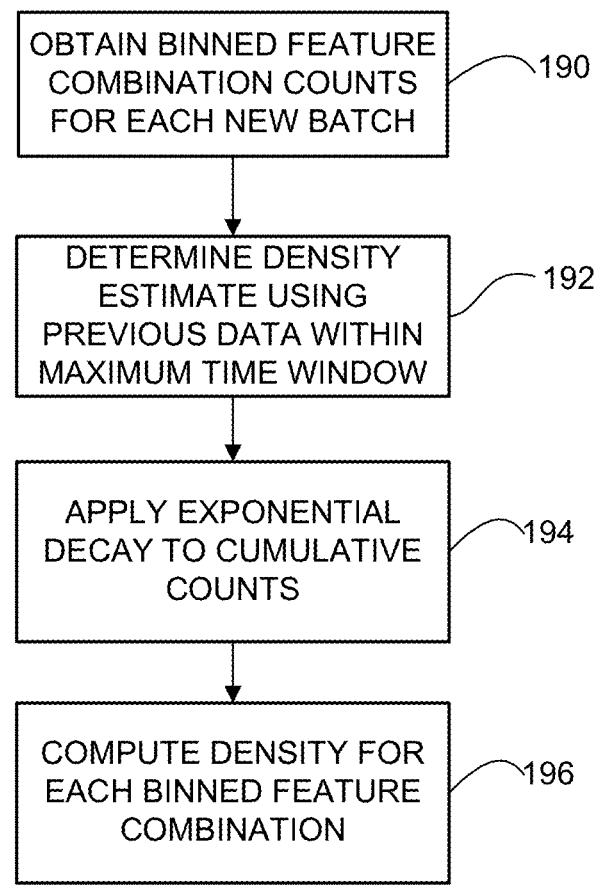
FIG. 9 is a flowchart illustrating a process for generating a time weighted binned feature density, in accordance with one embodiment.

FIG. 9 is a flowchart illustrating a process for determining density, in accordance with one embodiment. Once cell boundaries have been defined, new observations are processed in batches, based on units of time. Binned feature combination counts (i.e., number of observations within the bin) are obtained for each batch (step 190). The estimate of multivariate density may be generated based on historical frequencies of discretized feature combinations. For example, for each new batch, multivariate density estimates may be obtained using all previous data within a specified (e.g., user specified) maximum time window (step 192). In one or more embodiments, an exponential decay may be applied to the cumulative counts to date for each batch (step 194). This has the effect of assigning a higher weight to more recently observed features and a lower weight to stale observations. For each binned feature combination, the density may then be computed based on the total counts and number of observations that fall within the bin (adjusted by time series weight) (step 196).

In one example, for each batch, the frequency (F) of each binned feature combination (i, for i=1 ... N binned feature combinations) is calculated as the frequency for the old batch ($f_{oi}$) multiplied by e to the negative lambda plus the count in the new batch ($f_{ni}$). This may be expressed as:

$$F_i = f_{oi} e^{-\lambda} + f_{ni}$$

A larger value for lambda (greater than or equal to one) may be used except for the case in a particular environment in which typical traffic patterns are expected to change rapidly over time.

For each binned feature combination the density ($D_i$) may be computed as the total counts ($C_i$) divided by the product of the size of the bin (the number of possible observations that fall in the bin) ($O_i$) and the sum of the counts (after applying the exponential decay) ($F_i$). This can be expressed as:

$$D_i = \frac{C_i}{O_i \times F_i}$$

Figure 10:
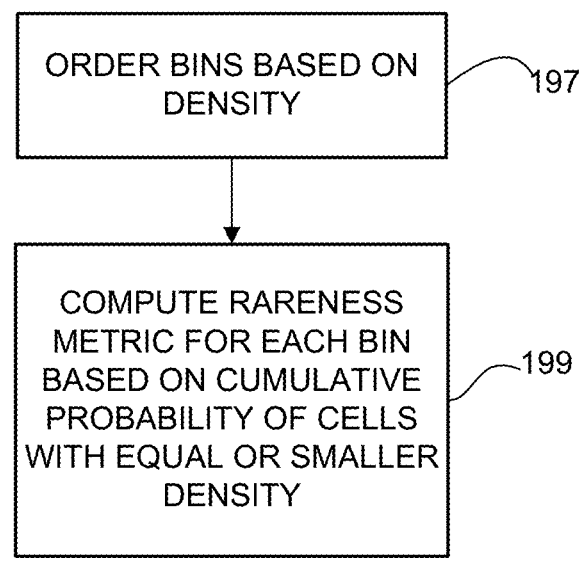
FIG. 10 is a flowchart illustrating a process for computing rareness metrics, in accordance with one embodiment.

FIG. 10 is a flowchart illustrating a process for computing rareness, in accordance with one embodiment. As described above, the binned feature combinations with lowest density correspond to the most rare regions. Once the density is calculated for each cell (as described above with respect to FIG. 9, for example), cells are ordered based on density (step 197). For each multivariate bin, a rareness metric may be computed as less than or equal to the probability of obtaining an observation for the bin plus the probability of obtaining an observation in all other bins with equal or smaller density (step 199). For each new observation, this approach provides a quantitative measure of rareness based on historical data.

Referring again to FIG. 7, the rareness associated with an observation in the fourth bin (172d) is visually shown. In this example, the rareness computation includes the fourth bin (172b) and all other bins with equal or smaller density (172e, 172g, 172i, 172j).

Once the bins (1, . . . , N) are ordered based on density (highest to lowest density), rareness for bin (i) may be expressed as:

R≤probability of obtaining an observation in bin (i)+ probability of obtaining an observation in bins (i+1, . . . , N);

where (i+1) includes all bins of equal density.

The term observation as used herein refers to observed data (feature) (e.g., byte count, packet count, etc.). The probability of obtaining an observation in a bin may be defined as the number of features in the bin/total number of possible features.

It is to be understood that the processes shown in FIGS. 9 and 10 and described above are only examples, and that steps may be added, modified, combined, or removed without departing from the scope of the embodiments.

In some cases, the characteristics of a particular network flow may not appear rare when compared to all other flows at that time, but may appear anomalous only when compared to other flows received at a particular provider IP address (or other entity). Additionally, any one of the flows in a port scan or DDoS (Distributed Denial of Service) attack may not be rare when compared to other flows observed at that time, but may appear anomalous as a group when compared to typical traffic volume observed for an IP address over time. Therefore, it may not be sufficient to identify anomalous network flows merely as flows with rare global feature characteristics. Instead, each potential anomaly unit may be compared to a variety of reference groups based on context, level, and comparison type. The following describes embodiments that may be used to increase the coverage and identification of potential malicious activity. One or more of these embodiments (or any combination thereof) may be used along with the above described embodiments.

In one embodiment, contextual anomalies may be defined using members of the same identifier group. Rather than computing a rareness value for each observation compared to all other observations, a rareness value may be computed based on particular contexts. For example, a flow having characteristics that are not unusual in a global sense may be very unusual between two particular IP addresses. For example, a particular type of flow that may be typical for a data center, may be unexpected if observed between two particular IP addresses. Another example may be a particular type of flow that is typical for an IP address, but not for that IP address' particular server port. In order to identify contextual anomalies, the feature combinations of each new flow may be compared to a subset of historical flows, based on the same contextual family.

In one example, two flow contexts are defined. Context may be based, for example, on the same combination of the following dimensions: (1) tenant, provider IP address, protocol, provider port and type; (2) tenant, provider IP address, consumer IP address, protocol, provider port and type. Rareness metrics may be calculated globally and for each of the contexts. Rareness metrics for multiple contexts provide a rich data source for downstream analysis. Anomaly statistics may be provided for each context, as well as feature plots for specific contexts, and context level statistics (i.e., context age, new contexts, missing contexts, and context level features over time such as proportion of anomalous flows and typical traffic volume). This data allows users to search for and identify anomalies using a fuller set of perspectives or contexts.

In one embodiment, different units of analysis are used to provide multiple views of data. In the above description, only one level of analysis has been discussed; the raw flow data. However, not all anomalies can be identified using a single unit of analysis. Some anomalies may not become apparent unless other levels of analysis are considered. In one or more embodiments, levels of analysis beyond the raw flow data may be used. Other entities (levels of analysis) may include IP addresses, applications, users, roles, or other entities. This approach allows for the identification of anomalous IP addresses, applications, users, and roles (beyond merely anomalous flows). One example is a DDoS (Distributed Denial of Service) attack in which each flow may have characteristics of typical traffic, yet as a group represent an anomalous event. This may also be conceptualized as a collective anomaly. For each level of analysis (or entity), a feature set may be derived using the raw flow data for a given time period. Each unit of analysis may have its own unique set of derived features. Example features for IP level data include flow rate, consumer to provider byte rate, provider to client median byte per packet, median flow duration, consumer in-degree, distinct protocols, distinct provider ports, etc. Other units of analysis may have other derived features. Using the same approach described above to compute rareness metrics for each new flow, rareness metrics may be calculated for other levels of analysis. Similarly, the concept of contextual anomalies applies to other analysis units as well. For example, with IP addresses as the unit of analysis, contextual anomalies may be determined based on members of the same tenant and EPG combination. Using multiple views allows for a richer landscape of data for anomaly detection and provides a data source for analysis for multiple entity types (e.g., flows, IP addresses, applications, users, and roles).

In one embodiment, flexible comparison types are used. For analysis units other than flows, two comparison types may be provided. The first is the type that has been described so far, comparing a new observation against other members of the same unit. For example, an IP address that exhibits feature combinations that differ from other IP addresses in the same EPG may be tagged as anomalous. The second type of comparison involves historical reference data for the same unit (self). In this case, an IP address that exhibits feature combinations that differ from the feature combinations seen historically by this same IP address may be identified as anomalous. Thus, an IP address (e.g., source) may exhibit suspicious behavior both when compared to other IP addresses in similar functions and compared to its own past behavior. Both comparisons may be used to provide a comprehensive analysis of potential suspicious activity. Broadening the scope of comparison types may reduce false negatives, thus increasing the recall of malicious network behavior. The additional comparison type of self enables a set of time series plots available to the user for each feature.

In one embodiment, traffic patterns may be modeled based on day of week and time of day. For example, flow start and end times may be used to determine whether the flow spans a weekday day, weekday night, or weekend. Three binary derived features may be computed to identify the presence or absence of the flow during each time category, for example. For each new flow, rareness is based on historical flows in the corresponding time categories. This approach may reduce false positives in environments in which network traffic varies considerably based on the time of day and day of the week, for example.

As can be observed from the foregoing, the embodiments described herein provide numerous advantages over conventional methods and systems for the application of anomaly detection for network metadata. One or more embodiments provide a nonparametric, scalable method for identifying network traffic anomalies in multidimensional data with many features. In one or more embodiments, a multivariate approach allows more outliers to be identified based on rare combinations of features, without making any assumptions about relationships between variables. This allows for the detection of observations that are anomalous only in their combination of features. For example, there may be many flows with small forward byte counts and many flows with large reverse byte counts, but the combination of small forward byte counts and large reverse byte counts may be rare. Since features may not be independent in the data (unusual bivariate relationships), a multivariate approach is advantageous. Binned density estimation provides a nonparametric approach, supporting distributions of any shape. Binning allows for computational efficiency, so that estimates can be based on a large volume of data. The embodiments allow outliers to be identified not only at the extremes of features, but in unusual pockets in the middle as well. The embodiments can handle many features and of different types (e.g., categorical, ordinal, numeric). Also, there is no notion of distance to specify across various scales and variable types. One or more embodiments support the defining characteristics of the data while not imposing unnecessary or inappropriate assumptions. The network metadata collected presents distributions that are unique in multiple aspects (e.g., lack of feature independence, features that are not hybrids of numeric and nominal type, and features that exhibit irregular and often spiky distributions). These unique and defining data characteristics limit the applicability of conventional methods and system, particularly those that are distance based, parametric, or univariate.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
receiving network data at an analytics device;
processing at the analytics device, the network data to identify anomalies, wherein processing comprises:
grouping features of the network data into multivariate bins at the analytics device;
generating a density for each of said multivariate bins at the analytics device;
computing at the analytics device, a rareness metric for each of said multivariate bins, wherein said rareness metric is based on a probability of obtaining a feature in a bin and said probability for all other of said multivariate bins with equal or smaller density;
identifying anomalies based on computed rareness metrics; and
transmitting said identified anomalies to a network device for use in detecting network activity potentially indicative of malicious behavior.

2. The method of claim 1 wherein said multivariate bins comprise bins of varying width.

3. The method of claim 2 wherein bin boundaries are based on univariate transition points.

4. The method of claim 1 wherein said density comprises a time weighted binned feature density.

5. The method of claim 4 wherein generating said time weighted binned feature density comprises applying an exponential decay to the features based on time of observation.

6. The method of claim 1 wherein generating said density comprises a nonparametric process.

7. The method of claim 1 wherein computing said rareness metric comprises computing rareness for different time categories corresponding to different days and time of day.

8. The method of claim 1 further comprising comparing the features to historical features corresponding to a same type of feature.

9. The method of claim 1 wherein said rareness metric is computed based on a context.

10. The method of claim 9 wherein said context is based on a tenant, a provider IP (Internet Protocol) address, a protocol, and a provider port and type.

11. The method of claim 1 wherein said rareness metric is computed for different units of analysis.

12. The method of claim 11 wherein said units of analysis are selected from a group consisting of IP (Internet Protocol) address, applications, users, and roles.

13. The method of claim 11 further comprising comparing said rareness metrics for one unit of analysis at different time periods.

14. The method of claim 1 wherein said probability comprises a cumulative probability taking into account historical data.

15. The method of claim 1 wherein the network data is collected from a plurality of sensors distributed throughout a network to monitor network flows within the network from multiple perspectives in the network.

16. An apparatus comprising:
an interface for receiving network data; and
a processor for grouping features of the network data into multivariate bins, generating a density for each of said multivariate bins, computing a rareness metric for each of said multivariate bins, wherein said rareness metric is based on a probability of obtaining a feature in a bin and said probability for all other of said multivariate bins with equal or smaller density, identifying anomalies based on computed rareness metrics; and transmitting said identified anomalies for use in detecting network activity potentially indicative of malicious behavior.

17. The apparatus of claim 16 wherein said multivariate bins comprise bins of varying width.

18. The apparatus of claim 16 wherein said density comprises a time weighted binned feature density and said probability comprises a cumulative probability, and wherein generating said density comprises a nonparametric process.

19. One or more non-transitory computer-readable media including logic encoded therein and when executed operable to:

process network data at an analytics device;
   group features of the network data into multivariate bins;
   generate a density for each of said multivariate bins;
   compute a rareness metric for each of said multivariate bins, wherein said rareness metric is based on a probability of obtaining a feature in a bin and said probability for all other of said multivariate bins with equal or smaller density;
   identify anomalies based on computed rareness metrics; and
   transmit said identified anomalies to a network device for use in detecting network activity potentially indicative of malicious behavior.

20. The non-transitory computer-readable media of claim 19 wherein said multivariate bins comprise bins of varying width.

* * * * *